US012626479B2

(12) United States Patent
Choi et al.

(10) Patent No.: US 12,626,479 B2
(45) Date of Patent: May 12, 2026

(54) DIFFERENCE DETECTION DEVICE AND METHOD

(71) Applicant: Meissa Planet Inc., Seoul (KR)

(72) Inventors: Chan hee Choi, Seoul (KR); Hyun sun Park, Seoul (KR); Dong young Kim, Seoul (KR)

(73) Assignee: Meissa Planet Inc., Seoul (KR)

( * ) Notice: Subject to any disclaimer, the term of this patent is extended or adjusted under 35 U.S.C. 154(b) by 265 days.

(21) Appl. No.: 18/395,274

(22) Filed: Dec. 22, 2023

(65) Prior Publication Data

US 2025/0086926 A1     Mar. 13, 2025

(30) Foreign Application Priority Data

Sep. 13, 2023    (KR) ........................ 10-2023-0122030

(51) Int. Cl.
*G06V 10/40*        (2022.01)
*G06V 10/75*        (2022.01)
*G06V 20/13*        (2022.01)

(52) U.S. Cl.
CPC ............ *G06V 10/40* (2022.01); *G06V 10/758* (2022.01); *G06V 20/13* (2022.01)

(58) Field of Classification Search
CPC ....... G06V 10/40; G06V 10/758; G06V 20/13
See application file for complete search history.

(56) References Cited

U.S. PATENT DOCUMENTS

2025/0086964 A1*    3/2025  Guerrero del Pozo ......................
                                                              G06V 10/762

OTHER PUBLICATIONS

Perez et al, "Combining Satellite Images with Feature Indices for Improved Change Detection", 2018, 9th IEEE Annual Ubiquitous Computing, Electronics & Mobile Communication Conference (UEMCON), pp. 438-444 (Year: 2018).*

* cited by examiner

*Primary Examiner* — David F Dunphy
(74) *Attorney, Agent, or Firm* — AEON Law, PLLC; Adam L.K. Philipp; Ki Yong O

(57)        ABSTRACT

A difference detection device comprising: a data collection module configured to collect a satellite image set comprising a plurality of satellite images; a pre-processing module configured to generate a pre-processing image set by matching characteristic information of the satellite images included in the satellite image set; and a difference determination module configured to generate difference information between the plurality of satellite images by determining a difference between pre-processing images included in the pre-processing image set, wherein the characteristic information comprises at least one of illumination information and color information of the satellite image.

6 Claims, 11 Drawing Sheets

1

External Database               Change Detection Device

DIFFERENCE DETECTION DEVICE AND METHOD

GOVERNMENT SUPPORT CLAUSE

This invention has been supported by the Ministry of Trade, Industry and Energy, and the Defense Acquisition Program Administration (Agency for Defense Development Cooperation). The notice number or announcement number of the research project is 2022-DC-2, and the name of the research project is "Support for Commercialization of Defense Technologies". The research project number is 22-DC-IN-17, and the title of the research project is "Feasibility Study of 'Aerial Imagery-based AI Smart Construction Service' commercialization". The research period is from Dec. 1, 2022, to Nov. 30, 2024.

BACKGROUND

CROSS-REFERENCE TO RELATED APPLICATION

This application claims priority under 35 U.S.C § 119 to Korean Patent Application No. 10-2023-0122030 filed on Sep. 13, 2023, in the Korean Intellectual Property Office, the entire contents of which is hereby incorporated by reference.

BACKGROUND

1. Technical Field

The present disclosure relates to a difference detection device and method.

Particularly, the present disclosure relates to a difference detection device and method capable of improving robustness in the detection of a change in a building by matching characteristic information (e.g., distributions) between multi-time satellite images.

Furthermore, the present disclosure relates to a difference detection device and method capable of improving robustness and performance for difference detection by using an adaptive difference detection algorithm in which an attention module has been added to a difference detection algorithm.

2. Related Art

Contents described in this part merely provide background information of the present embodiment and do not constitute a conventional technology.

Currently, several hundreds of satellites perform their unique tasks above the earth for weather, telecommunications, broadcasting, agriculture, space development, and military purposes. Satellite images that are photographed by the satellites are public data and are variously used in several fields.

The satellite image is an image that is photographed at a very high altitude. Accordingly, a technology for processing, analyzing and/or storing the satellite image by using a deep learning technology is recently in the spotlight.

In this case, a difference detection technology, that is, one of utilization points for the analysis of a satellite image, is a technology for checking the new construction or extinction of a building within a corresponding time interval by comparing and analyzing multi-time satellite images.

However, in a current difference detection technology, improving the robustness of a difference detection model is merely attempted through data augmentation, but attempts to perform accurate difference detection by matching characteristic information (e.g., distributions) between multi-time satellite images are not present.

Accordingly, there is a sufficient need for a technology capable of increasing the robustness of difference detection through pre-processing by matching characteristic information (e.g., distributions) between multi-time satellite images.

The description set forth in the background section should not be assumed to be prior art merely because it is set forth in the background section. The background section may describe aspects or embodiments of the disclosure.

SUMMARY

Various embodiments are directed to providing a difference detection device and method capable of improving robustness in the detection of a change in a building, for example, by matching characteristic information between multi-time satellite images. Specifically, various embodiments are directed to providing a difference detection device and method capable of detecting a change in a building more accurately by matching pieces of illumination information and pieces of color information between multi-time satellite images by using a reference image.

Also, various embodiments are directed to providing a difference detection device and method capable of improving the robustness of difference detection and performance by using an adaptive difference detection algorithm in which an attention module has been added to a difference detection algorithm. Specifically, various embodiments are directed to providing a difference detection device and method capable of performing an exchange process using each channel and the importance of a space by additionally using an attention module relating to a channel exchange module for exchanging any one of pieces of RGB information in each of images and an attention module relating to a spatial exchange module for exchanging pixels of the images at specific coordinates, and thus improving the robustness and performance of difference detection and.

Objects of the present disclosure are not limited to the aforementioned objects, and other objects and advantages of the present disclosure not described above may be understood from the following description and more evidently understood based on embodiments of the present disclosure. It may also be easily seen that the objects and advantages of the present disclosure may be realized by means written in the claims and a combination thereof.

A difference detection device and method according to some embodiments of the present disclosure can improve robustness in the detection of a change in a building, for example, by matching characteristic information between multi-time satellite images. Specifically, the difference detection device and method according to some embodiments of the present disclosure can detect a change in a building more accurately by matching pieces of illumination information and pieces of color information between multi-time satellite images by using a reference image.

Furthermore, the difference detection device and method according to some embodiments of the present disclosure can further improve the robustness of difference detection and performance by using an adaptive difference detection algorithm in which an attention module has been added to a difference detection algorithm. That is, the difference detection device and method according to some embodiments of the present disclosure can perform an exchange process using each channel and the importance of a space by additionally using an attention module relating to the channel exchange module for exchanging any one of pieces of RGB information in each of images and an attention module relating to the spatial exchange module for exchanging pixels of the images at specific coordinates, and thus can further improve the robustness and performance of difference detection.

According to some aspects of the disclosure, a difference detection device comprises; a data collection module configured to collect a satellite image set comprising a plurality of satellite images a pre-processing module configured to generate a pre-processing image set by matching characteristic information of the satellite images included in the satellite image set, and a difference determination module configured to generate difference information between the plurality of satellite images by determining a difference between pre-processing images included in the pre-processing image set, wherein the characteristic information comprises at least one of illumination information and color information of the satellite image.

According to some aspects, the satellite image set comprises a first satellite image photographed at first timing and a second satellite image photographed at second timing different from the first timing, and the first satellite image and the second satellite image comprise photographed satellite images of an identical coordinate region.

According to some aspects, the pre-processing module generates the pre-processing image set based on a predefined reference image.

According to some aspects, the pre-processing module determines characteristic information of the reference image as reference characteristic information by extracting the characteristic information of the reference image, and changes the characteristic information of each of the satellite images included in the satellite image set based on the determined reference characteristic information.

According to some aspects, the pre-processing module changes the characteristic information of each of the satellite images included in the satellite image set by using a predefined image processing algorithm.

According to some aspects, the image processing algorithm comprises at least one of image histogram matching and feature distribution matching.

According to some aspects, the difference determination module generates the difference information by using a deep learning technology.

According to some aspects, the difference determination module generates the difference information based on a predefined difference detection algorithm in relation to difference detection between a plurality of images.

According to some aspects, further comprising a learning module configured to train an adaptive difference detection algorithm in which an attention module has been added to the difference detection algorithm, wherein the difference determination module generates the difference information by using the adaptive difference detection algorithm.

According to some aspects, the adaptive difference detection algorithm comprises: a first attention module that is an attention module relating to a channel exchange module for changing at least one of pieces of RGB information in each of the pre-processing images of the pre-processing image set, and a second attention module that is an attention module relating to a spatial exchange module for exchanging at least one pixel of each of the pre-processing images of the pre-processing image set at specific coordinates.

Aspects of the disclosure are not limited to those mentioned above and other objects and advantages of the disclosure that have not been mentioned can be understood by the following description and will be more clearly understood according to embodiments of the disclosure. In addition, it will be readily understood that the objects and advantages of the disclosure can be realized by the means and combinations thereof set forth in the claims.

Detailed effects of the present disclosure along with the aforementioned contents are described hereinafter while describing detailed contents for implementing the present disclosure.

BRIEF DESCRIPTION OF THE DRAWINGS

FIG. 7 is a diagram for describing an adaptive difference detection algorithm according to some embodiments of the present disclosure.

DETAILED DESCRIPTION

Figure 1:
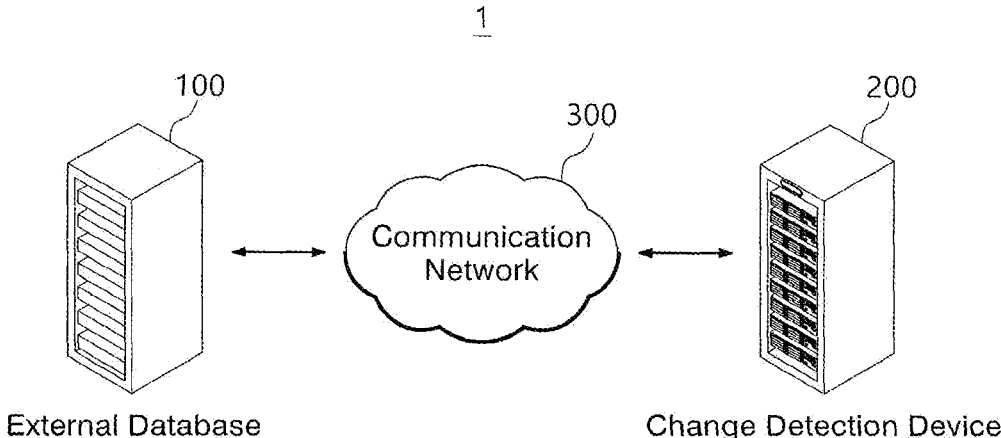
FIG. 1 illustrates a difference detection system according to some embodiments of the present disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own inventive concept in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are only used to differentiate one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular forms are intended to include plural forms unless the context clearly indicates otherwise. In the application, terms such as "comprise," "comprise," "have," etc. should be understood as not precluding the possibility of existence or addition of features, numbers, steps, operations, components, parts, or combinations thereof described herein.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless being defined otherwise, all terms used herein, including technical or scientific terms, have the same meaning as commonly understood by those skilled in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the application. In addition, each configuration, procedure, process, method, or the like included in each embodiment of the disclosure may be shared to the extent that they are not technically contradictory to each other.

Hereinafter, a difference detection device and method according to some embodiments of the present disclosure are described with reference to FIGS. 1 to 9.

FIG. 1 illustrates a difference detection system according to some embodiments of the present disclosure.

Referring to FIG. 1, a difference detection system 1 according to some embodiments of the present disclosure may include an external database 100, a difference detection device 200, and a communication network 300.

The external database 100 may be a database for storing, managing and/or transmitting original data, that is, a target for difference detection.

As some examples, the external database 100 may have forms, such as various forms of electronic devices such as a computer, a laptop PC, a mobile device, and a wearable device, a workstation, a data center, an Internet data center (IDC), a direct attached storage (DAS) system, a storage area network (SAN) system, a network attached storage (NAS) system, and a redundant array of inexpensive disks or a redundant array of independent disks (RAID) system, but an embodiment of the present disclosure is not limited thereto.

The external database 100 may transmit, to the difference detection device 200, original data that are necessary for the difference detection device 200 to perform difference detection. In other words, the difference detection device 200 may receive the original data related to the difference detection from the external database 100.

The original data may mean a data set, that is, a target for difference detection. For example, the original data may include a video, an image frame, an image, or a panorama for a specific coordinate region. In other words, the original data may include video data, image frame data, image data, or panorama data for a specific coordinate region, but an embodiment of the present disclosure is not limited thereto.

As some examples, the original data may include a set of satellite images of a specific coordinate region.

The satellite image set may mean a set of images of a specific coordinate region, which is photographed by satel-lites in the sky having a predetermined height. In other words, the satellite image set may include a plurality of satellite images of a specific coordinate region, which are photographed by satellites.

For example, the satellite image set may include a first satellite image of a specific coordinate region, which has been photographed at first timing, and a second satellite image of the specific coordinate region, which has been photographed at second timing. In this case, the first timing and the second timing may be pieces of different timing. For example, the second timing may be timing that is temporally behind the first timing. Furthermore, the first satellite image and the second satellite image may be satellite images of the same coordinate region.

Put together, the satellite image set may include a plurality of satellite images of the same coordinate region, which are photographed at pieces of different timing. The satellite image set may be called a "multi-time satellite image".

Hereinafter, a case in which original data that are stored and managed by the external database 100 are a satellite image set is assumed and described for convenience of description.

The difference detection device 200 may generate difference information between satellite images included in a satellite image set. In other words, the difference detection device 200 may perform difference detection on a satellite image set received from the external database 100.

In this case, the difference detection device 200 may have forms, such as a workstation, a data center, an Internet data center (IDC), a direct attached storage (DAS) system, a storage area network (SAN) system, a network attached storage (NAS) system, and a redundant array of inexpensive disks or a redundant array of independent disks (RAID) system, but an embodiment of the present disclosure is not limited thereto.

As some examples, after pre-processing a satellite image set, the difference detection device 200 may generate difference information between pre-processed satellite images included in the satellite image set.

Specifically, first, the difference detection device 200 may generate a pre-processing image set by matching characteristic information (e.g., distributions) of the satellite images included in the satellite image set.

For example, the difference detection device 200 may generate a first pre-processing image and a second pre-processing image by matching characteristic information of a first satellite image and a second satellite image that are included in a satellite image set, and may determine the generated first pre-processing image and second pre-processing image as a pre-processing image set.

The characteristic information may include illumination information and color information. In other words, the difference detection device 200 may perform a pre-processing task for matching illumination information or color information of a first satellite image and a second satellite image.

The illumination information may include information on the amount of light and/or the intensity of light that arrives at a specific coordinate region that is determined within a satellite image. In other words, the illumination information may include information on the amount and intensity of light that arrives at a specific coordinate region of a satellite image.

The color information may include information on the characteristics of a color of each pixel of a satellite image. In other words, the color information may include information on a channel (i.e., any one of pieces of red, green, and blue (RGB) information) that are included in pixels of a satellite image.

Through the pre-processing process, the difference detection device 200 according to an embodiment of the present disclosure can perform more accurate difference detections, so that the robustness of difference detection can be increased.

That is, if pieces of illumination information or color information of satellite images that are included in a satellite image set are different, a difference detection having an object of determining the new construction and extinction of a structure, such as a building, may not be properly performed. Specifically, from a viewpoint of "illumination information", a first satellite image, among a plurality of satellite images relating to the same coordinate region, might have been photographed with high illumination at a specific time. A second satellite image, among the plurality of satellite images, might have been photographed with low illumination at a different time. A difference between the pieces of illumination may result in a change in the image characteristic, such as the length of a shadow of a building, or the reflection characteristic of an object. As a result, there is a danger of misrecognition when a change is detected based on the characteristics. Furthermore, from a viewpoint of "color information", if pieces of color information of the first satellite image and the second satellite image are not consistent, for example, a building may brightly appear in the first satellite image, whereas the building may darkly appear in the second satellite image. In this case, confusion may be caused in determining whether the building is present in each of satellite images.

As described above, if the consistency of illumination information and/or color information of the satellite images that are included in a satellite image set is not guaranteed, the chances of confusing an actual change (e.g., the new construction or demolition of a building) and a change attributable to an external factor (illumination and/or color) may be increased. Accordingly, the difference detection device 200 according to an embodiment of the present disclosure can increase the robustness of difference detection by performing pre-processing in a way to reduce the influence of an external factor.

In this case, the difference detection device 200 may match information on the characteristics of satellite images by using a reference image.

For example, the difference detection device 200 may determine reference characteristic information based on a reference image, and may match characteristic information of satellite images based on the determined reference characteristic information. In other words, the difference detection device 200 may process the characteristic information of the satellite images so that the characteristic information is matched with the reference characteristic information.

In this case, the difference detection device 200 may change the characteristic information of the satellite images by using a predefined image processing algorithm. In other words, the difference detection device 200 may use the predefined image processing algorithm when processing the characteristic information of the satellite images so that the characteristic information is matched with the reference characteristic information.

The image processing algorithm that is used by the difference detection device 200 may include an image histogram matching algorithm for matching pieces of brightness of satellite images and/or a feature distribution matching algorithm for comparing distributions of feature points of images and matching the distributions. However, an embodiment of the present disclosure is not limited to the algorithms. The difference detection device 200 may use other algorithms, such as color transfer, gamma corrections, and white balance adjustment.

When the pre-processing task is completed, the difference detection device 200 may generate difference information between satellite images of a satellite image set by comparing corresponding pre-processing images. In other words, the difference detection device 200 may determine difference information between a first satellite image that has been photographed at first timing and a second satellite image that has been photographed at second timing through a comparison between the pre-processing images.

In this case, the difference information may include information on a structure (e.g., a building) that was constructed or extinct at the second timing compared to the first timing.

As some examples, the difference detection device 200 may generate difference information by using a deep learning technology. In other words, the difference detection device 200 may compare a first pre-processing image and a second pre-processing image that are included in a pre-processing image set by using a deep learning technology, and may generate difference information based on a result of the comparison.

For example, the difference detection device 200 may generate difference information based on a predefined difference detection algorithm. For example, the difference detection device 200 may train an adaptive difference detection algorithm in which an attention module has been added to the difference detection algorithm, and may generate difference information by using the trained adaptive difference detection algorithm.

In this case, the adaptive difference detection algorithm may include a first attention module, that is, an attention module relating to a channel exchange module for exchanging any one of pieces of RGB information in each of pre-processing images included in a pre-processing image set, and/or a second attention module, that is, an attention module relating to a spatial exchange module for exchanging pixels at specific coordinates in each of pre-processing images included in a pre-processing image set.

A detailed operating process of the difference detection device 200 will be described later.

The communication network 300 plays a role of connecting the external database 100 and the difference detection device 200. That is, the communication network 300 means a communication network that provides a connection path so that the difference detection device 200 can transmit and receive data to and from the external database 100. The communication network 300 may cover wired networks, such as local area networks (LANs), wide area networks (WANs), metropolitan area networks (MANs), and integrated service digital networks (ISDNs), and wireless networks, such as wireless LANs, CDMA, Bluetooth, and satellite communication, for example, but the scope of the present disclosure is not limited thereto.

Hereinafter, the difference detection device 200 is described more specifically with reference to FIG. 2.

Figure 2:
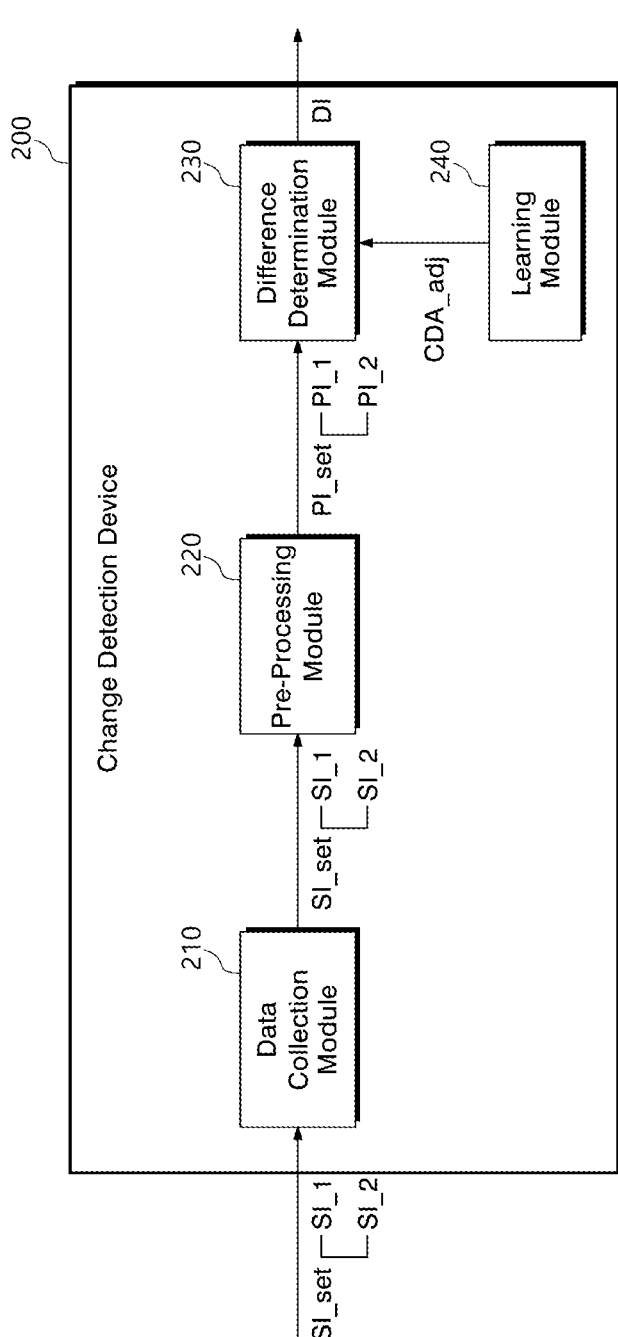
FIG. 2 is a block diagram of the difference detection device according to some embodiments of the present disclosure.

FIG. 2 is a block diagram of the difference detection device according to some embodiments of the present disclosure.

Referring to FIGS. 1 and 2, the difference detection device 200 may receive a satellite image set (hereinafter referred to as an "SI_set") and may generate difference information (hereinafter referred to as "DI") by performing difference detection based on the received satellite image set SI_set.

Specifically, the difference detection device 200 may include a data collection module 210, a pre-processing module 220, a difference determination module 230, and a learning module 240.

The data collection module 210 may receive the satellite image set SI_set. In other words, the data collection module 210 may receive the satellite image set SI_set from the external database 100.

The satellite image set SI_set may mean an image set of a specific coordinate region, which has been photographed by satellites in the sky having a predetermined height. In other words, the satellite image set SI_set may include a plurality of satellite images SI_1 and SI_2 of the specific coordinate region, which have been photographed by the satellites.

Hereinafter, the satellite image set SI_set is described more specifically with reference to FIG. 3.

Figure 3:
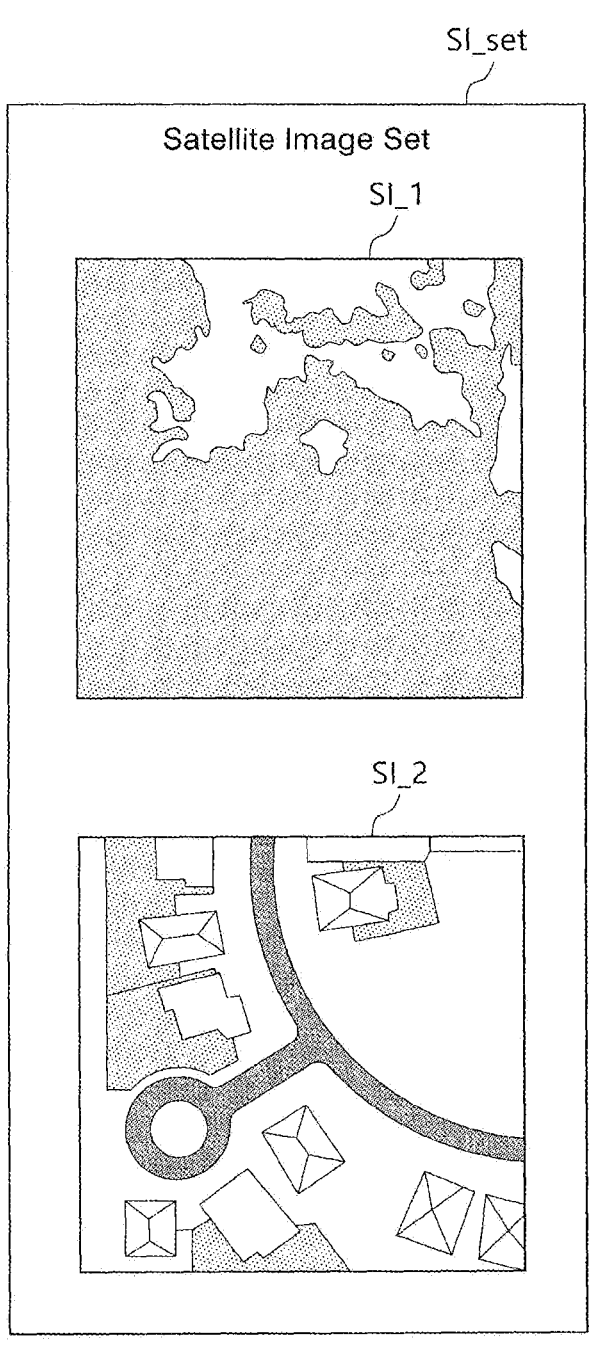
FIG. 3 is a diagram for describing a satellite image set according to some embodiments of the present disclosure.

FIG. 3 is a diagram for describing a satellite image set according to some embodiments of the present disclosure.

Referring to FIG. 3, the satellite image set SI_set may mean an image set of a specific coordinate region, which has been photographed by satellites in the sky having a prede-termined height. In other words, the satellite image set SI_set may include a plurality of satellite images SI_1 and SI_2 of the specific coordinate region, which have been photographed by the satellites.

For example, the satellite image set SI_set may include a first satellite image SI_1 of a specific coordinate region, which has been photographed at first timing, and a second satellite image SI_2 of the specific coordinate region, which has been photographed at second timing. In this case, the first timing and the second timing may be pieces of different timing. For example, the second timing may be timing that is temporally behind the first timing.

In this case, the first satellite image SI_1 and the second satellite image SI_2 may be satellite images of the same coordinate region. In other words, the first satellite image SI_1 and the second satellite image SI_2 may be satellite images that have been photographed with respect to the same coordinate region.

Put together, the satellite image set SI_set may include the plurality of satellite images SI_1 and SI_2 of the same coordinate region, which have been photographed at pieces of different timing. The satellite image set SI_set may be called a "multi-time satellite image".

Referring back to FIGS. 1 and 2, the data collection module 210 may transfer the received satellite image set SI_set to another component of the difference detection device 200. For example, the data collection module 210 may transfer the satellite image set SI_set to the pre-processing module 220, but an embodiment of the present disclosure is not limited thereto.

Various communication modules may be used for the data collection module 210. The data collection module 210 may perform the exchange of data between the external database 100 and the difference detection device 200 over the com-munication network (300 in FIG. 1).

The pre-processing module 220 may pre-process the satellite image set SI_set. In other words, the pre-processing module 220 may generate a pre-processing image set (here-inafter referred to as a "PI_set") by pre-processing the satellite image set SI_set. That is, the pre-processing module 220 may generate a first pre-processing image PI_1 and a second pre-processing image PI_2 by pre-processing the first satellite image SI_1 and the second satellite image SI_2, respectively.

As some examples, the pre-processing module 220 may generate the pre-processing image set PI_set by matching characteristic information (e.g., distributions) of satellite images included in the satellite image set SI_set. In other words, the pre-processing module 220 may generate the first pre-processing image PI_1 and the second pre-processing image PI_2 by matching the characteristic information of the first satellite image SI_1 and the second satellite image SI_2. That is, pieces of characteristic information of the first pre-processing image PI_1 and the second pre-processing image PI_2, which have been generated by the pre-process-ing module 220, may be the same or may be similar to each other within a predetermined critical range.

The characteristic information may include illumination information or color information. In other words, the pre-processing module 220 may perform a pre-processing task for matching illumination information or color information of the first satellite image SI_1 and the second satellite image SI_2.

The illumination information may include information on the amount of light and/or the intensity of light that arrives at a specific coordinate region that is determined within a satellite image. In other words, the illumination information may include information on the amount and intensity of light that arrives at the specific coordinate region of the satellite image.

The color information may include information on the characteristics of a color of each pixel of a satellite image. In other words, the color information may include informa-tion on a channel (i.e., any one of pieces of RGB informa-tion) of each pixel of the satellite image.

Through the pre-processing process, the difference detec-tion device 200 according to an embodiment of the present disclosure can detect a difference more accurately, so that the robustness of difference detection can be increased.

That is, when pieces of illumination information or pieces of color information included in the satellite images SI_1 and SI_2 included in the satellite image set SI_set are different from each other, difference detection having an object of determining the new construction and extinction of a structure, such as a building, may not be properly per-formed. Specifically, from a viewpoint of the "illumination information", the first satellite image SI_1, among the plurality of satellite images SI_1 and SI_2 of the same coordinate region, might have been photographed with high illumination at a specific time. The second satellite image SI_2, among the plurality of satellite images SI_1 and SI_2 of the same coordinate region, might have been photo-graphed with low illumination at a different time. A differ-ence between the high illumination and the low illumination may result in a change in the image characteristic, such as the length of a shadow of a building or the reflection characteristic of an object. Accordingly, there is a danger of misrecognition when a difference is detected based on the characteristics. Furthermore, from a viewpoint of the "color information", if the pieces of color information of the first satellite image SI_1 and the second satellite image SI_2 are not consistent, for example, a building may brightly appear in the first satellite image SI_1, and may darkly appear in the second satellite image SI_2. In this case, confusion may be caused in determining whether the building is present in each of the satellite images SI_1 and SI_2.

As described above, if the consistency of the illumination information and/or color information of the satellite images SI_1 and SI_2 included in the satellite image set SI_set is not guaranteed, the chances of confusing an actual difference (e.g., the new construction or demolition of a building) and a difference attributable to an external factor (e.g., illumination and/or a color) may be increased. Accordingly, the pre-processing module 220 according to an embodiment of the present disclosure can increase the robustness of difference detection by performing pre-processing in a way to reduce the influence of an external factor.

In this case, the pre-processing module 220 may match the characteristic information of the satellite images SI_1 and SI_2 by using a reference image.

Hereinafter, a process of the pre-processing module 220 according to an embodiment of the present disclosure generating the pre-processing image set PI_set by using a reference image is described more specifically with reference to FIGS. 4A and 4B.

Figure 4A:
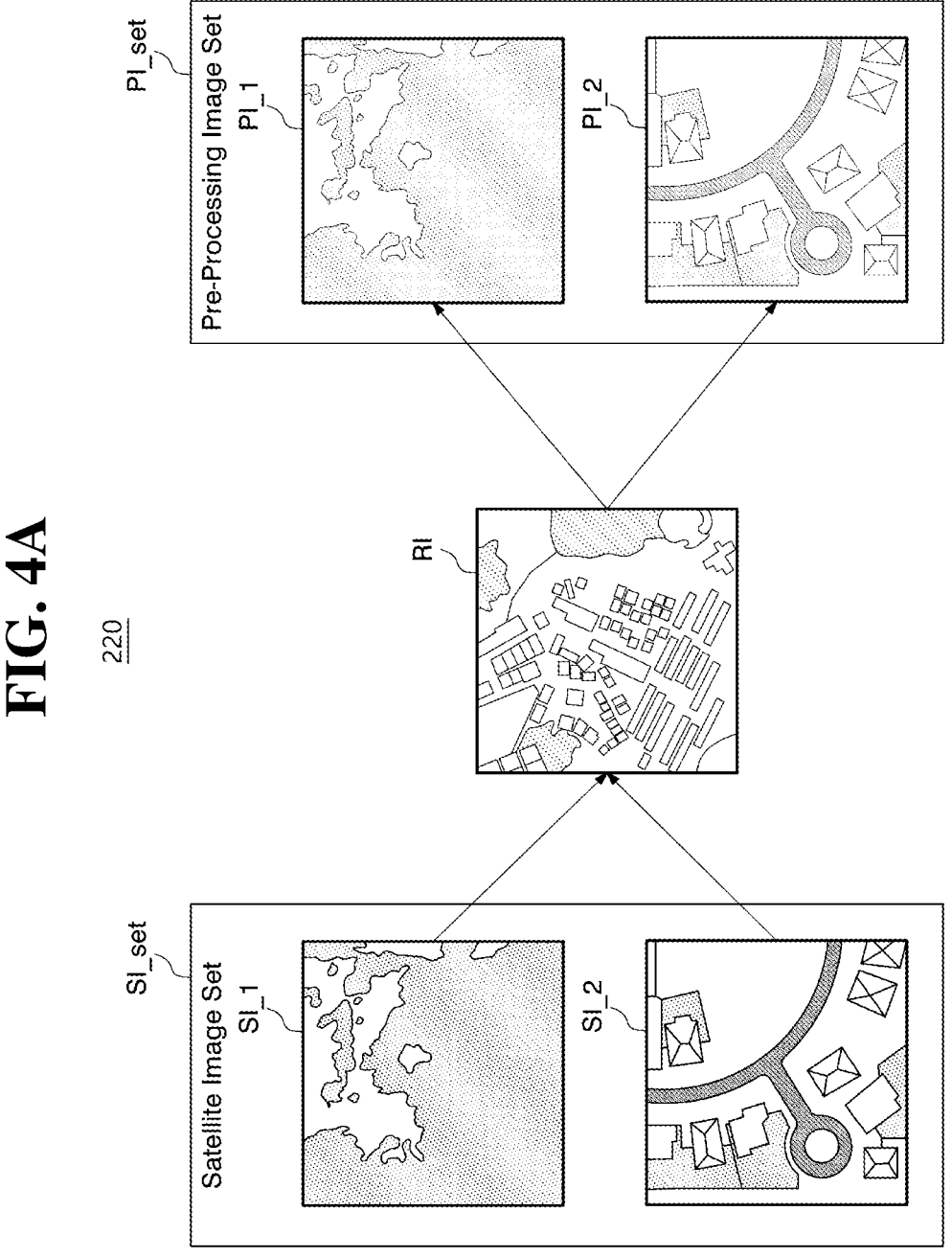
FIG. 4A is a concept view illustrating a process of the pre-processing module 220 performing pre-processing by using a reference image (hereinafter referred to as an "RI").
Figure 4B:
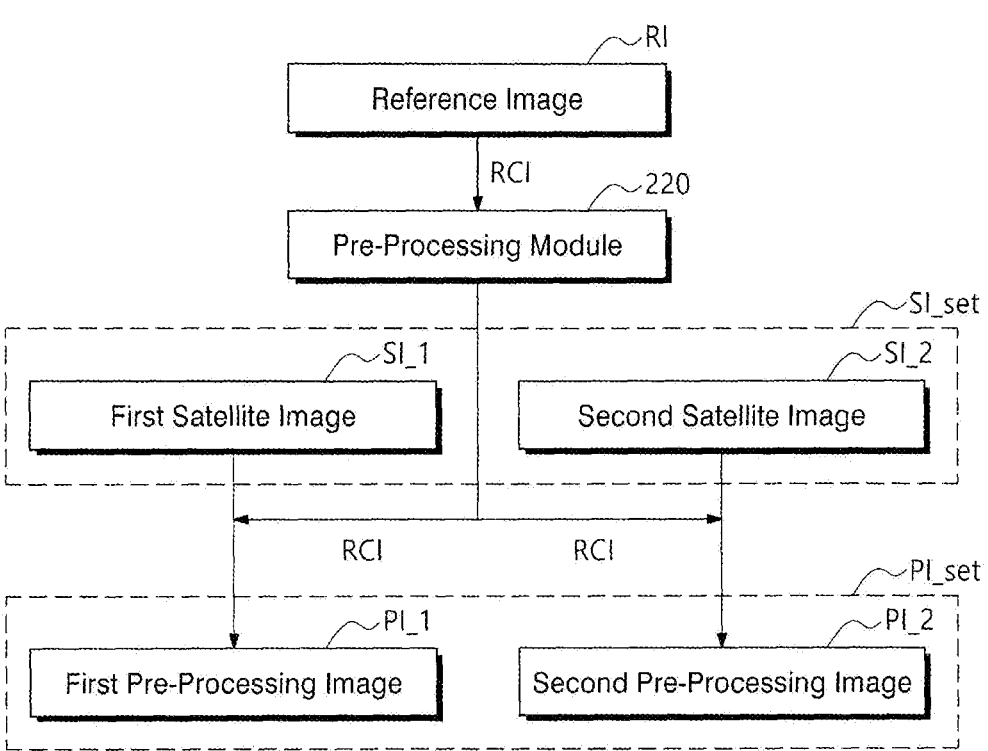
FIG. 4B is a block diagram illustrating a process of the pre-processing module 220 performing pre-processing by using the reference image RI.

FIGS. 4A and 4B are diagrams for describing an operation of the pre-processing module according to some embodiments of the present disclosure. Specifically, FIG. 4A is a concept view illustrating a process of the pre-processing module 220 performing pre-processing by using a reference image (hereinafter referred to as an "RI"). FIG. 4B is a block diagram illustrating a process of the pre-processing module 220 performing pre-processing by using the reference image RI.

Referring to FIGS. 4A and 4B, the pre-processing module 220 may pre-process each of the satellite images SI_1 and SI_2 included in the satellite image set SI_set by using the reference image RI.

As some examples, the pre-processing module 220 may generate the pre-processing image set PI_set by matching characteristic information of the satellite images SI_1 and SI_2 included in the satellite image set SI_set by using the reference image RI.

In this case, as described above, the characteristic information may include illumination information or color information. The illumination information may include information on the amount of light and/or the intensity of light that arrives at a specific coordinate region that is determined within the satellite image. In other words, the illumination information may include information on the amount and intensity of light that arrives at the specific coordinate region of the satellite image. The color information may include information on the characteristics of a color of each pixel of the satellite image. In other words, the color information may include information on a channel (i.e., any one of pieces of RGB information) of each pixel of the satellite image.

Specifically, first, the pre-processing module 220 may extract reference characteristic information (hereinafter referred to as an "RCI") from the reference image RI. For example, the pre-processing module 220 may extract the reference characteristic information RCI by using a predetermined characteristic information determination algorithm. In this case, the characteristic information determination algorithm may include a known algorithms based on histogram analysis or feature analysis, for example, but an embodiment of the present disclosure is not limited thereto.

Next, the pre-processing module 220 may match characteristic information of the satellite images SI_1 and SI_2 based on the reference characteristic information RCI. In other words, the difference detection device 200 may process the characteristic information of each of the satellite images SI_1 and SI_2 so that the characteristic information has the same value as the reference characteristic information RCI.

In this case, the difference detection device 200 may change the characteristic information of each of the satellite images SI_1 and SI_2 by using a predefined image processing algorithm. In other words, the difference detection device 200 may use the predefined image processing algorithm when processing the characteristic information of each of the satellite images SI_1 and SI_2 so that the characteristic information is matched with the reference characteristic information RCI.

The image processing algorithm that is used by the difference detection device 200 may include image histogram matching for identically matching pieces of brightness of satellite images and/or feature distribution matching for comparing and matching distributions of the feature points of satellite images, but an embodiment of the present disclosure is not limited thereto. The difference detection device 200 may use other algorithms, such as color transfer, gamma corrections, and white balance adjustment.

Pieces of characteristic information of the first pre-processing image PI_1 and second pre-processing image PI_2 of the pre-processing image set PI_set, which have been generated by the pre-processing module 220, may be the same or may be similar to each other within a predetermined critical range.

Referring back to FIGS. 1 and 2, the pre-processing module 220 may transfer the generated pre-processing image set to the difference determination module 230.

The difference determination module 230 may generate difference information DI between the satellite images SI_1 and SI_2 of the satellite image set SI_set by comparing the pre-processing images PI_1 and PI_2 included in the pre-processing image set PI_set. In other words, the difference detection device 200 may determine the difference information DI between the first satellite image SI_1, which has been photographed at first timing, and the second satellite image SI_2, which has been photographed at second timing, through a comparison between the pre-processing images PI_1 and PI_2.

In this case, the difference information DI may include information on a structure (e.g., a building) that has been newly constructed or become extinct at the second timing compared to the first timing.

As some examples, the difference determination module 230 may generate the difference information DI by using a deep learning technology.

In this case, the difference determination module 230 may be trained based on machine learning.

More specifically, in a deep learning technology, that is, a kind of machine learning, training is performed down to a deep level in multiple steps based on data. That is, deep learning indicates a set of machine learning algorithms for extracting core data from a plurality of data while raising the step.

As some examples, the difference determination module 230 may use various deep learning structures. For example, the difference determination module 230 may use structures, such as a convolutional neural network (CNN), a recurrent neural network (RNN), a deep belief network (DBN), a graph neural network (GNN), a generative adversarial network (GAN), a transformer, and an autoencoder.

Specifically, the CNN is a model that has simulated a person's brain function, which is generated based on the assumption that a person extracts basic characteristics of an object when recognizing the object and then recognizes the object based on the results of complicated calculation in the brain. The CNN may include known structures, such as LeNet, AlexNet, VGGNet, GoogleNet, and ResNet, but an embodiment of the present disclosure is not limited thereto.

The RNN is used in natural language processing a lot. The RNN has a structure that is effective in time-series data processing that varies with the passage of time, and may construct an artificial neural network structure by piling up layers every time.

The DBN is a deep learning structure constructed by piling up a restricted Boltzman machine (RBM), that is, deep learning scheme, in multiple layers. When a predetermined number of layers is piled up by repeating the training of RBM, a DBN having a corresponding number of layers may be constructed.

The GNN indicates an artificial neural network structure implemented by using a method of deriving similarity and feature points between modeling data by using modeling data that have been modeled based on mapped data between specific parameters.

The GAN indicates an artificial neural network structure that produces new data having a form similar to that of input data by using a generative neural network and a distinction neural network. The GAN may include a deep convolutional GAN (DCGAN), a conditional GAN (CGAN), a Wasserstein GAN (WGAN), a style-based GAN (StyleGAN), and a CycleGAN that have been known, but an embodiment of the present disclosure is not limited thereto.

The transformer is an artificial neural network having an encoder-decoder structure using attention, and can check an overall meaning between an input sequence and an output sequence. The transformer enables all the elements of the input sequence to affect the output sequence by using an attention mechanism. Accordingly, both the encoder and the decoder may take the entire sequence into consideration. The transformer may use an image as an input by patching the image in addition to a natural language and time-series data.

The autoencoder is a deep learning structure that plays a role of extracting and reconstructing the characteristics of data. Representatively, the autoencoder includes an encoder that compresses an input value and a decoder that restores the compressed data. The encoder converts the input value into latent representation having a low dimension. The decoder restores the latent representation to representation having the same dimension as the input value. In this case, the encoder and the decoder may each be formed of a multi-layer perceptron (MLP). When the autoencoder is trained, the autoencoder learns a weight and a bias in a way to input data to the autoencoder and to minimize a difference between an output value and the input value. The autoencoder that has been trained as described above may well extract the characteristics of the input data and restore input data including noise. The autoencoder is chiefly used in fields, such as data compression, a dimension reduction, noise removal, and data generation, and may also be used in fields, such as image recognition, natural language processing, and voice recognition.

The training of an artificial neural network of the difference determination module 230 may also be performed by adjusting (also adjusting a bias value, if necessary) the weight of a connection lines between nodes so that a desired output is generated with respect to a given input. Furthermore, the artificial neural network may continuously update a weight value by training. Furthermore, a method, such as back propagation, may be used in the training of the artificial network.

In this case, unsupervised learning, semi-supervised learning, and supervised learning may be used as a machine learning method of the artificial neural network. Furthermore, the difference determination module 230 may be controlled to automatically update an artificial neural network structure for outputting analysis data after being trained based on setting.

Hereinafter, a neural network structure of the difference determination module 230, which has been implemented through a deep learning technology, according to some embodiments of the present disclosure is described more specifically with reference to FIG. 5A.

Figure 5A:
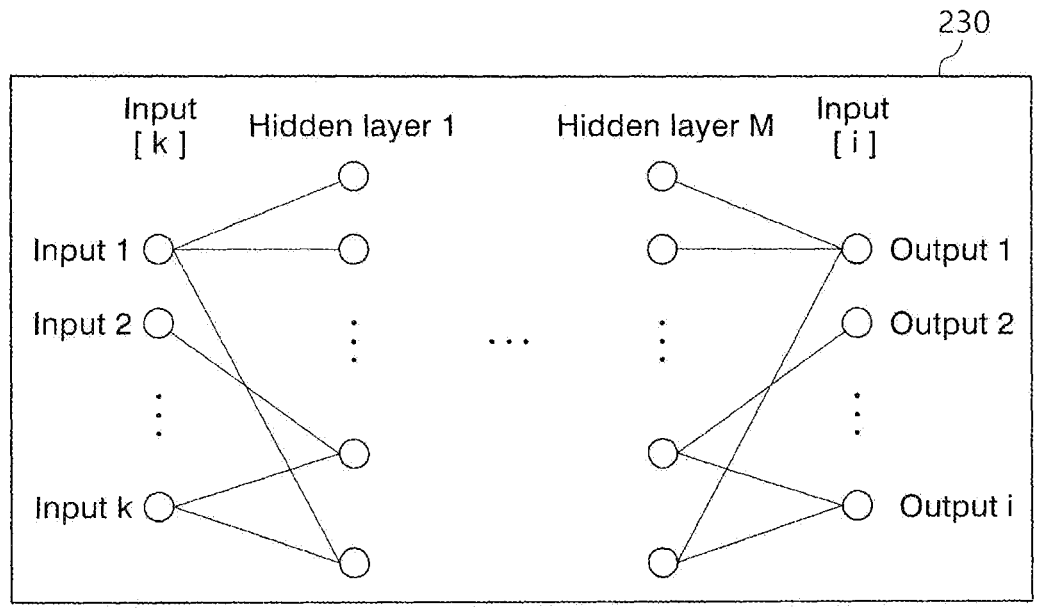
FIG. 5A is a diagram for describing a neural network structure of a deep learning module according to some embodiments of the present disclosure.

FIG. 5A is a diagram for describing a neural network structure of a deep learning module according to some embodiments of the present disclosure.

Referring to FIGS. 2 and 5A, the difference determination module 230 according to some embodiments of the present disclosure may include an input layer having an input node to which the pre-processing image set PI_set is input, an output layer having an output node from which the difference information DI is output, and M hidden layers disposed between the input layer and the output layer.

In this case, a weight may be set at an edge that connects the nodes of the layers. Whether the weight or the edge is present may be added, removed, or updated in a learning process. Accordingly, the weights of the nodes and the edges disposed between k input nodes and i output nodes may be updated through the learning process.

Before the difference determination module 230 performs training, an initial value may be set for all the nodes and edges. However, if information is accumulated and input, the weights of the nodes and the edges may be changed. A parameter (e.g., the pre-processing image set PI_set) that is input as a learning factor and a value (e.g., the difference information DI) that is allocated to the output node may be matched in this process.

Additionally, if a cloud server is used, the difference determination module 230 may receive and process a large number of parameters. Accordingly, the difference determination module 230 may perform training based on massive data.

The weights of the nodes and the edges between the input node and the output node that constitute the difference determination module 230 may be updated by a learning process of the difference determination module 230. Furthermore, in addition to the pre-processing image set PI_set and the difference information DI, various data may be added and expanded as the parameter that is input to or output from the difference determination module 230.

Hereinafter, the autoencoder that is used in the present disclosure is described more specifically with reference to FIG. 5B.

Figure 5B:
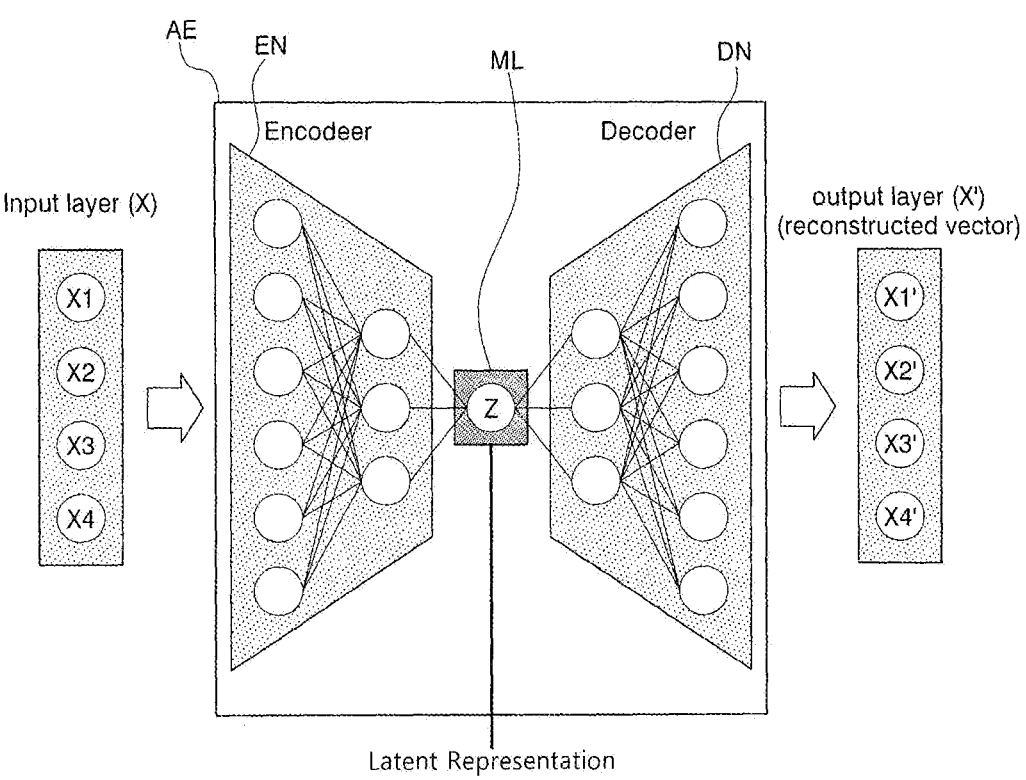
FIG. 5B is a diagram for describing the autoencoder according to some embodiments of the present disclosure.

FIG. 5B is a diagram for describing the autoencoder according to some embodiments of the present disclosure.

Referring to FIGS. 2 and 5B, the autoencoder (hereinafter referred to as an "AE") includes an encoder network (hereinafter "EN") and a decoder network (hereinafter "DN"), and may include a middle layer (ML) that is disposed between the encoder unit EN and the decoder unit DN.

The autoencoder AE is a kind of deep neural network model that makes output data thereof identical with data (i.e., input data) by reducing the input data through the compression of the input data through the encoder unit EN, and converting the reduced data into data having the same size as the input data from the encoder unit EN and outputting the converted data through the decoder unit DN.

The autoencoder AE learns the characteristics of input data in an unsupervised way. To this end, the autoencoder AE may convert data that are received through the encoder unit EN into data having a low dimension (i.e., latent representation) that well represents corresponding characteristics. Thereafter, the converted data may be restored to original data again through the decoder unit DN.

The autoencoder AE has an object of minimizing a reconstruction error corresponding to a difference between original data X1, X2, X3, and X4, that is, input data (i.e., the pre-processing image set PI_set) and restored data X1', X2', X3', and X4', that is, output data (i.e., the difference information DI), and may learn patterns that are embedded in the original data.

Referring back to FIGS. 1 and 2, the difference determination module 230 using a deep learning technology may generate the difference information DI by using a predefined difference detection algorithm (hereinafter referred to as "CDA").

As some examples, the learning module 240 may train an adaptive difference detection algorithm CDA_adj in which an attention module has been added to the difference detection algorithm CDA. The difference determination module 230 may generate the difference information DI by using the adaptive difference detection algorithm CDA_adj that has been trained by the learning module 240 and received therefrom.

In this case, the adaptive difference detection algorithm may include a first attention module, that is, an attention module relating to a channel exchange module for exchanging any one of pieces of RGB information in each of the pre-processing images PI_1 and PI_2 included in the pre-processing image set PI_set, and/or a second attention module, that is, an attention module relating to a spatial exchange module for exchanging pixels at specific coordinates in each of the pre-processing images PI_1 and PI_2 included in the pre-processing image set PI_set.

Hereinafter, the predefined difference detection algorithm is described with reference to FIG. 6. The adaptive difference detection algorithm that is used by the difference determination module 230 according to some embodiments of the present disclosure is described with reference to FIG. 7.

Figure 6:
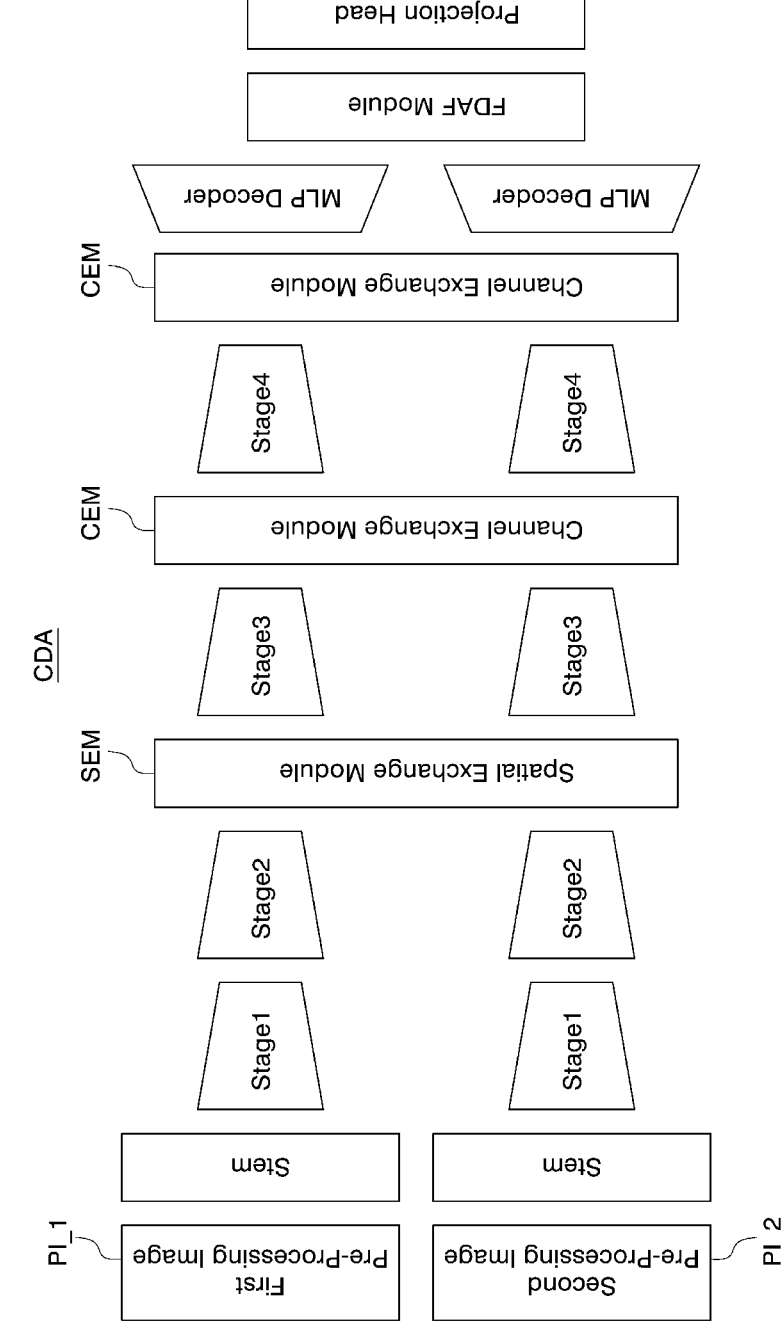
FIG. 6 is a diagram for describing a predefined difference detection algorithm.

FIG. 6 is a diagram for describing a predefined difference detection algorithm.

Referring to FIG. 6, the difference detection algorithm CDA may be an algorithm that searches for a changed portion between the plurality of pre-processing images PI_1 and PI_2 having pieces of different timing. In this case, the difference detection algorithm CDA may be an algorithm based on binary semantic segmentation.

An operating method of the difference detection algorithm CDA is specifically described. First, the pre-processing images PI_1 and PI_2 may be input to stems, respectively.

Next, features may be extracted from the pre-processing images PI_1 and PI_2 through the stems, first stages Stage1, and second stages Stage2.

Next, the spatial exchange module (hereinafter referred to as an "SEM") may perform a process of exchanging pixels of the pre-processing images PI_1 and PI_2 at specific coordinates. For example, the spatial exchange module SEM may change and/or replace the values of pixels (e.g., 100× 100, 100×102, or 100×104) at an arbitrary position, in the pre-processing images PI_1 and PI_2 each having 256×256 pixels.

In this case, the number of pixels that are changed between the pre-processing images PI_1 and PI_2 by the spatial exchange module SEM may be various. In other words, the spatial exchange module SEM may change and/or replace the values of one or two or more pixels of the pre-processing images PI_1 and PI_2.

Next, features may be extracted from the pre-processing images PI_1 and PI_2 through third stages Stage3, respectively.

Next, a channel exchange module (hereinafter referred to as a "CEM") may perform a process of changing any one or a plurality of pieces of channel information of each of the pre-processing images PI_1 and PI_2, such as RGB information. In other words, the channel exchange module CEM may mutually change and/or replace a value in any one channel (e.g., any one of pieces of RGB information) or a plurality of channels (e.g., any two of pieces of RGB information) in each of the pre-processing images PI_1 and PI_2.

In this case, the number of channels that are changed between the pre-processing images PI_1 and PI_2 by the channel exchange module CEM may be various. In other words, the channel exchange module CEM may mutually change and/or replace one or two or more channels in each of the pre-processing images PI_1 and PI_2.

Next, features may be extracted from the pre-processing images PI_1 and PI_2 through fourth stages Stage4, respectively.

Next, the channel exchange module CEM may perform a process of exchanging any one of pieces of RGB information again in each of the pre-processing images PI_1 and PI_2.

Next, MLP decoders may each restore the results of the execution of the process to data having the same form as the input data (i.e., each of the pre-processing images PI_1 and PI_2).

Next, a flow dual alignment fusion (FDAF) module may merge the features that have been restored by the MLP decoders into one, and may detect a changed portion between the two pre-processing images PI_1 and PI_2.

As some examples, the FDAF module may perform a pre-task for detecting a changed portion between the pre-processing images PI_1 and PI_2. In this case, the pre-task that is performed by the FDAF module may include a task for supplementing a registration error between the features that have been extracted from the pre-processing images PI_1 and PI_2.

For example, the FDAF module may calculate each distance through a process of obtaining a correction feature by inputting feature maps that are extracted from the pre-processing images PI_1 and PI_2, respectively, into a small neural network consisting of two convolution layers and comparing the obtained correction feature with an original feature map. Thereafter, the FDAF module may correct the registration error between the features that have been extracted from the pre-processing images PI_1 and PI_2, respectively, based on the obtained distance, and may detect a changed portion between the pre-processing images PI_1 and PI_2.

Next, a projection head may display the changed portion that has been detected by the FDAF module within one image.

Figure 7:
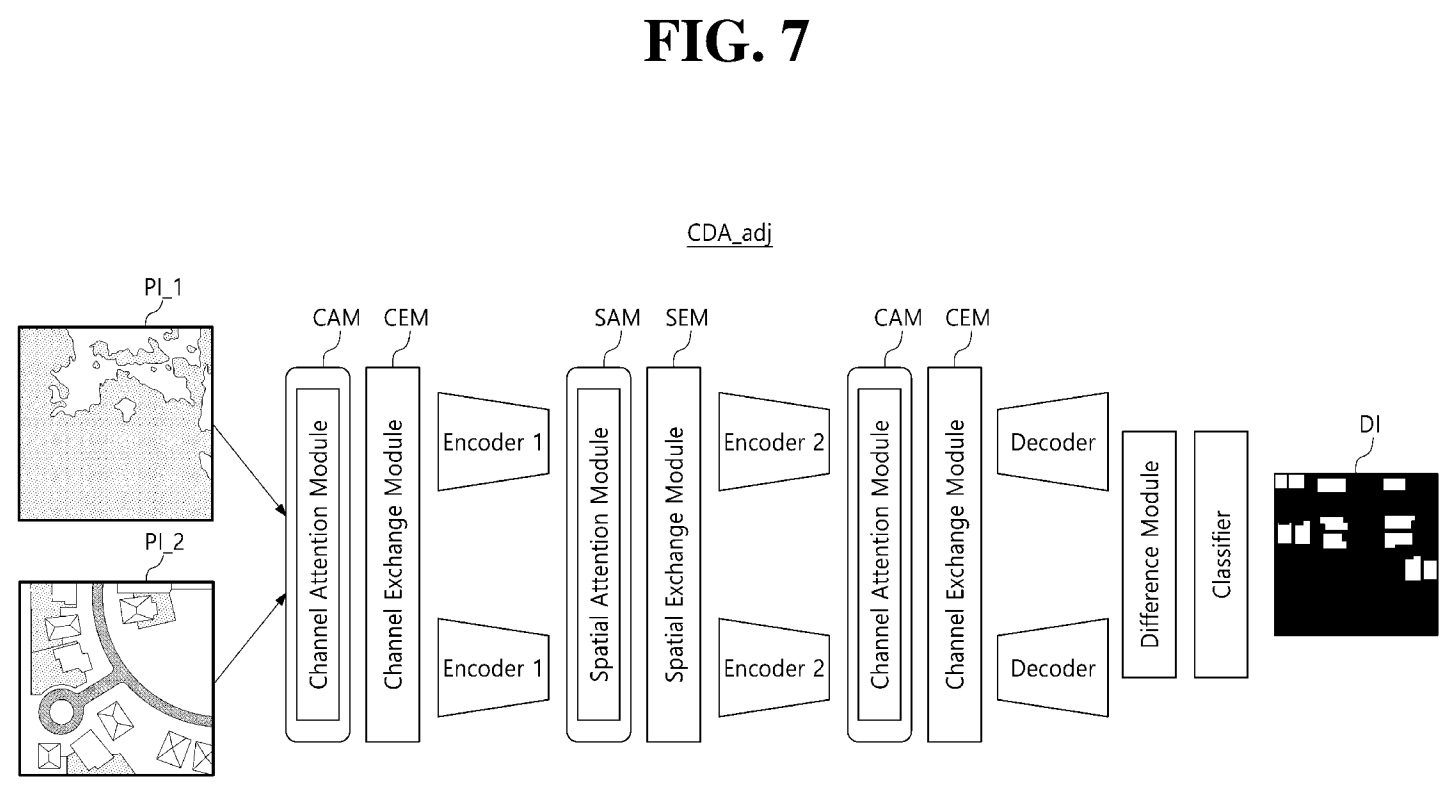

FIG. 7 is a diagram for describing an adaptive difference detection algorithm according to some embodiments of the present disclosure.

Referring to FIG. 7, the adaptive difference detection algorithm CDA_adj may be an algorithm for searching for a changed portion between the plurality of pre-processing images PI_1 and PI_2 having pieces of different timing. In this case, the adaptive difference detection algorithm CDA_adj may be an algorithm based on binary semantic segmentation.

The adaptive difference detection algorithm CDA_adj may further include a channel attention module (hereinafter referred to as a "CAM"), that is, an attention module relating to the channel exchange module CEM, and a spatial attention module (hereinafter referred to as an "SAM"), that is, an attention module relating to the spatial exchange module SEM, compared to the difference detection algorithm CDA in FIG. 6.

An attention mechanism that is performed by the attention module enables a corresponding algorithm to be further focused on an important portion by assigning a weight to various portions of data. Accordingly, the attention module may calculate a weight indicative of the importance or relevance of a specific portion or a specific value in each of the pre-processing images PI_1 and PI_2. For example, the channel attention module CAM may determine whether it is important to exchange which channel values, among pieces of RGB information, between the pre-processing images PI_1 and PI_2 in generating the difference information DI. The spatial attention module SAM may determine whether it is important to exchange which location pixel values between the pre-processing images PI_1 and PI_2 in generating the difference information DI.

An operating method of the adaptive difference detection algorithm CDA_adj is specifically described. First, the input images PI_1 and PI_2 may be input to the channel attention module CAM.

The channel attention module CAM may determine whether it is important to exchange which channel values, among pieces of RGB information, between the pre-processing images PI_1 and PI_2 in generating the difference information DI. In other words, the channel attention module CAM may transfer, to the channel exchange module CEM, exchange information regarding which channel values, among the pieces of RGB information, will be exchanged between the pre-processing images PI_1 and PI_2 based on the results of a determination of the importance. In this case, the number of channels to be exchanged, which is determined by the channel attention module CAM, may be one or two or more.

Next, the channel exchange module CEM may perform a process of exchanging any one or two or more channels in each of the pre-processing images PI_1 and PI_2, among pieces of RGB information, between the pre-processing images PI_1 and PI_2. For example, the channel exchange module CEM may mutually change or replace any one or two or more channels (i.e., any one or a plurality of pieces of RGB information) based on the exchange information that is transmitted by the channel attention module CAM, in each of the pre-processing images PI_1 and PI_2.

Next, encoding may be performed through first encoders Encoder1.

Next, the results of the encoding may be input to spatial attention modules SAM.

The spatial attention modules SAM may determine whether it is important to exchange which location pixel values between the pre-processing images PI_1 and PI_2 in generating the difference information DI. In other words, the spatial attention module SAM may transfer, to the spatial exchange module SEM, to exchange information regarding that pixels at which coordinates will be exchanged between the pre-processing images PI_1 and PI_2 based on the results of the determination of importance. In this case, the number of pixels to be exchanged, which is determined by the spatial attention module SAM, may be one or two or more.

Next, the spatial exchange module SEM may perform a process of exchanging pixels at specific coordinates between the pre-processing images PI_1 and PI_2. For example, the spatial exchange module SEM may change or replace the values of pixels (e.g., 150×150, 100×100, 100×102, or 100×104) in the pre-processing images PI_1 and PI_2, respectively, according to exchange information that is transmitted by the spatial attention module SAM, in the pre-processing images PI_1 and PI_2 each consisting of 256×256 pixels.

Next, encoding may be performed through second encoders Encoder2.

Next, the results of the encoding may be input to the channel attention module CAM. The channel exchange module CEM may perform an exchange process based on exchange information that is output by the channel attention module CAM. A detailed description of the exchange process has been described above, and is omitted.

Next, decoding may be performed through decoders. For example, the decoders may each perform a process of restoring the results that have been performed by the above process in the form of the input data (i.e., each of the pre-processing images PI_1 and PI_2). In this case, the decoder may perform the same role as the MLP decoder in FIG. 6.

Next, a difference module may detect a changed portion between the two pre-processing images PI_1 and PI_2 by merging the values restored by the decoders into one. In this case, the difference module may perform the same role as the FDAF module in FIG. 6.

Next, a classifier may generate difference information DI by displaying the changed portion that has been detected by the difference module within one image. In this case, the classifier may perform the same role as the projection head in FIG. 6.

An embodiment of the generated difference information DI is not limited to that illustrated in FIG. 7.

Figure 8:
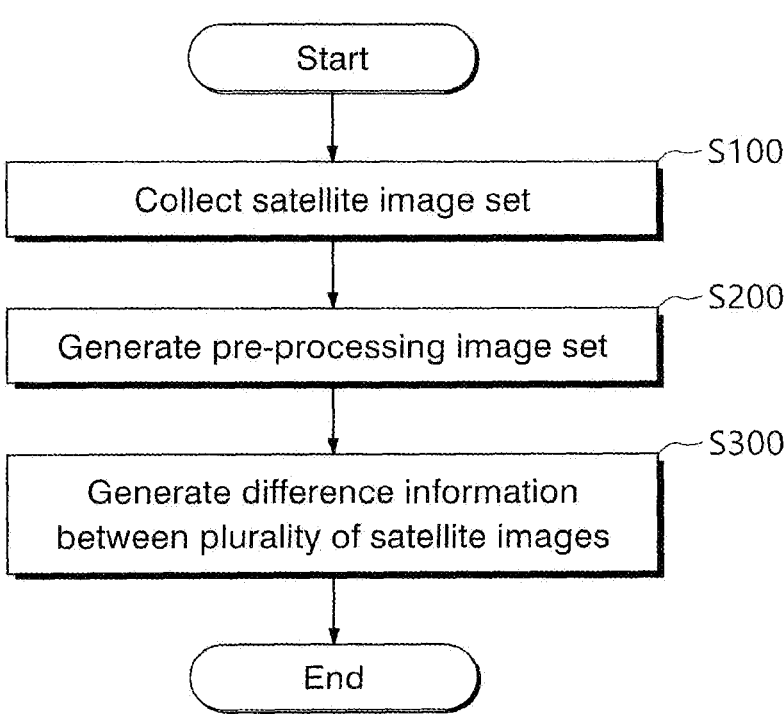
FIG. 8 is a flowchart of a difference detection method according to some embodiments of the present disclosure.

FIG. 8 is a flowchart of a difference detection method according to some embodiments of the present disclosure. Steps S100 to S300 in FIG. 8 may be performed by the difference detection device (200 in FIG. 1) in FIGS. 1 and 2. The difference detection method is described in brief below except redundant contents.

Referring to FIGS. 1, 2, and 8, first, the satellite image set SI_set may be collected at S100.

As some examples, the data collection module 210 may receive the satellite image set SI_set from the external database 100.

The satellite image set SI_set may mean an image set of a specific coordinate region, which has been photographed by satellites in the sky having a predetermined height. In other words, the satellite image set SI_set may include a plurality of satellite images SI_1 and SI_2 of the specific coordinate region, which have been photographed by the satellites.

For example, the satellite image set SI_set may include the first satellite image SI_1 of the specific coordinate region, which has been photographed at first timing, and the second satellite image SI_2 of the specific coordinate region, which has been photographed at second timing. In this case, the first timing and the second timing may be pieces of different timing. For example, the second timing may be timing that is temporally behind the first timing.

In this case, the first satellite image SI_1 and the second satellite image SI_2 may be satellite images of the same coordinate region. In other words, the first satellite image SI_1 and the second satellite image SI_2 may be satellite images that have been photographed with respect to the same coordinate region.

Next, the pre-processing image set PI_set may be generated at S200.

As some examples, the pre-processing module 220 may generate the pre-processing image set PI_set by pre-processing the satellite image set SI_set. That is, the pre-processing module 220 may generate the first pre-processing image PI_1 and the second pre-processing image PI_2 by pre-processing the first satellite image SI_1 and the second satellite image SI_2, respectively.

As some examples, the pre-processing module 220 may generate the pre-processing image set PI_set by matching characteristic information (e.g., distributions) of satellite images included in the satellite image set SI_set. In other words, the pre-processing module 220 may generate the first pre-processing image PI_1 and the second pre-processing image PI_2 by matching the characteristic information of the first satellite image SI_1 and the second satellite image SI_2. That is, pieces of characteristic information of the first pre-processing image PI_1 and the second pre-processing image PI_2, which have been generated by the pre-processing module 220, may be the same or may be similar to each other within a predetermined critical range.

The characteristic information may include illumination information or color information. In other words, the pre-processing module 220 may perform a pre-processing task for matching illumination information or color information of the first satellite image SI_1 and the second satellite image SI_2.

The illumination information may include information on the amount of light and/or the intensity of light that arrives at a specific coordinate region that is determined within a satellite image. In other words, the illumination information may include information on the amount and intensity of light that arrives at the specific coordinate region of the satellite image.

The color information may include information on the characteristics of a color of each pixel of a satellite image. In other words, the color information may include information on a channel (i.e., any one of pieces of RGB information) of each pixel of the satellite image.

In this case, the pre-processing module 220 may match the information on the characteristics of satellite images by using a reference image.

For example, the pre-processing module 220 may determine reference characteristic information based on a reference image, and may match characteristic information of satellite images based on the determined reference characteristic information. In other words, the pre-processing module 220 may process the characteristic information of the satellite images so that the characteristic information is matched with the reference characteristic information.

In this case, the pre-processing module 220 may change the characteristic information of the satellite images by using a predefined image processing algorithm. In other words, the pre-processing module 220 may use the predefined image processing algorithm when processing the characteristic information of the satellite images so that the characteristic information is matched with the reference characteristic information.

The image processing algorithm that is used by the pre-processing module 220 may include an image histogram matching algorithm for matching pieces of brightness of satellite images and/or a feature distribution matching algorithm for comparing distributions of feature points of images and matching the distributions. However, an embodiment of the present disclosure is not limited to the algorithms. The difference detection device 200 may use other algorithms, such as color transfer, gamma corrections, and white balance adjustment.

Next, the difference information DI between the plurality of satellite images may be generated at S300.

As some examples, the difference determination module 230 may generate difference information DI between the satellite images SI_1 and SI_2 of the satellite image set SI_set by comparing the pre-processing images PI_1 and PI_2 included in the pre-processing image set PI_set. In other words, the difference detection device 200 may determine the difference information DI between the first satellite image SI_1, which has been photographed at first timing, and the second satellite image SI_2, which has been photographed at second timing, through a comparison between the pre-processing images PI_1 and PI_2.

In this case, the difference information DI may include information on a structure (e.g., a building) that has been newly constructed or become extinct at the second timing compared to the first timing.

As some examples, the difference determination module 230 may generate the difference information DI by using a deep learning technology. In other words, the difference determination module 230 may compare the first pre-processing image PI_1 and the second pre-processing image PI_2 that are included in the pre-processing image set PI_set by using a deep learning technology, and may generate the difference information DI based on a result of the comparison.

For example, the difference determination module 230 may generate the difference information DI based on a predefined difference detection algorithm. For example, the difference determination module 230 may train the adaptive difference detection algorithm CDA_adj in which an attention module has been added to the difference detection algorithm, and may generate the difference information DI by using the trained adaptive difference detection algorithm CDA_adj.

In this case, the adaptive difference detection algorithm CDA_adj may include a first attention module, that is, an attention module relating to a channel exchange module for exchanging any one of pieces of RGB information in each of the pre-processing images PI_1 and PI_2 included in the pre-processing image set PI_set, and/or a second attention module, that is, an attention module relating to a spatial exchange module for exchanging pixels at specific coordinates in each of the pre-processing images PI_1 and PI_2 included in the pre-processing image set PI_set.

Figure 9:
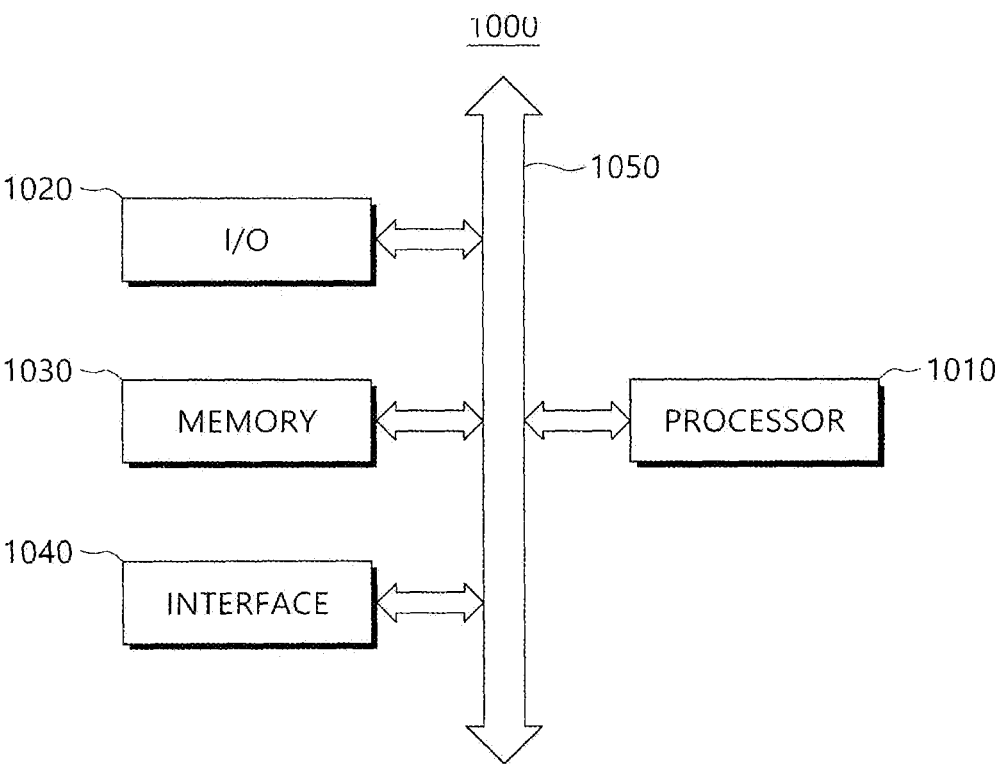
FIG. 9 is a diagram for describing a hardware implementation of the difference detection device that performs the difference detection method according to some embodiments of the present disclosure.

FIG. 9 is a diagram for describing a hardware implementation of the difference detection device that performs the difference detection method according to some embodiments of the present disclosure.

Referring to FIG. 9, the difference detection device 200 that performs the difference detection method according to some embodiments of the present disclosure may be implemented as an electronic device 1000. The electronic device 1000 may include a controller 1010, an input and output (I/O) device 1020, a memory device 1030, an interface 1040, and a bus 1050. The controller 1010, the input and output device 1020, the memory device 1030, and/or the interface

1040 may be connected through the bus 1050. In this case, the bus 1050 corresponds to a path through which data are moved.

Specifically, the controller 1010 may include at least one of a central processing unit (CPU), a micro processor unit (MPU), a micro controller unit (MCU), a graphic processing unit (GPU), a microprocessor, a digital signal processor, a microcontroller, an application processor (AP), and logic devices each capable of performing a function similar to the function of each of them.

The input and output device 1020 may include at least one of a keypad, a keyboard, a touch screen, and a display device.

The memory device 1030 may store data and/or a program.

The interface 1040 may perform a function for transmitting data to a communication network or receiving data from a communication network. The interface 1040 may have a wired or wireless form. For example, the interface 1040 may include an antenna or a wired/wireless transceiver. Although not illustrated, the memory device 1030 is operating memory for improving an operation of the controller 1010, and may further include high-speed DRAM and/or SRAM. The memory device 1030 may store a program or an application therein.

The difference detection device 200 and the external database 100 according to embodiments of the present disclosure may be a system that is formed by connecting a plurality of electronic device 1000 over a network. In such a case, each module or combinations of the modules may be implemented as the electronic device 1000. However, the present embodiment is not limited to the case.

Additionally, the difference detection device 200 may be implemented as at least one of a workstation, a data center, an Internet data center (IDC), a direct attached storage (DAS) system, a storage area network (SAN) system, a network attached storage (NAS) system, a redundant array of inexpensive disks or redundant array of independent disks (RAID) system, and an electronic document management (EDMS) system, but the present embodiment is not limited thereto.

Furthermore, the difference detection device 200 may transmit data to the external database 100 over a network. The network may include networks based on a wired Internet technology, a wireless Internet technology, and a short-distance communication technology. The wired Internet technology may include at least one of a local area network (LAN) and a wide area network (WAN), for example.

The wireless Internet technology may include at least one of technologies, such as a wireless LAN (WLAN), digital living network alliance (DMNA), wireless broadband (Wibro), world interoperability for microwave access (Wimax), high speed downlink packet access (HSDPA), high speed uplink packet access (HSUPA), IEEE 802.16, long term evolution (LTE), LTE-advanced (LTE-A), wireless mobile broadband service (WMBS), and 5G new radio (NR), for example, but the present embodiment is not limited thereto.

The short-distance communication technology may include at least one of Bluetooth, radio frequency identification (RFID), infrared data association (IrDA), an ultra-wideband (UWB), ZigBee, near field communication (NFC), ultra sound communication (USC), visible light communication (VLC), Wi-Fi, Wi-Fi Direct, and 5G NR, for example, but the present embodiment is not limited thereto.

The difference detection device 200 that performs communication over a network may conform to a technology standard and a standard communication method for mobile communication. For example, the standard communication method may include at least one of global system for mobile communication (GSM), code division multi-access (CDMA), CDMA2000, enhanced voice-data optimized or enhanced voice-data only (EV-DO), wideband CDMA (WCDMA), high speed downlink packet access (HSDPA), high speed uplink packet access (HSUPA), long term evolution (LTE), LTE-advanced (LTE-A), and 5G NR, but the present embodiment is not limited thereto.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. A difference detection device comprising:
a processor; a memory operatively coupled to the processor and storing instructions that, when executed by the processor, cause the processor to implement: a data collection module configured to collect a satellite image set comprising a plurality of satellite images;
a pre-processing module configured to generate a pre-processing image set by matching characteristic information of the satellite images included in the satellite image set; and
a difference determination module configured to generate difference information between the plurality of satellite images by determining a difference between pre-processing images included in the pre-processing image set, wherein the characteristic information comprises at least one of illumination information and color information of the satellite image,
wherein the pre-processing module generates the pre-processing image set based on a predefined reference image,
wherein the pre-processing module determines characteristic information of the reference image as reference characteristic information by extracting the characteristic information of the reference image, and changes the characteristic information of each of the satellite images included in the satellite image set based on the determined reference characteristic information.

2. The difference detection device of claim 1, wherein:
the satellite image set comprises a first satellite image photographed at first timing and a second satellite image photographed at second timing different from the first timing, and
the first satellite image and the second satellite image comprise photographed satellite images of an identical coordinate region.

3. The difference detection device of claim 1, wherein the pre-processing module changes the characteristic information of each of the satellite images included in the satellite image set by using a predefined image processing algorithm.

4. The difference detection device of claim 3, wherein the image processing algorithm comprises at least one of image histogram matching and feature distribution matching.

5. A difference detection device comprising:
a processor; a memory operatively coupled to the processor and storing instructions that, when executed by the processor, cause the processor to implement: a data collection module configured to collect a satellite image set comprising a plurality of satellite images;

a pre-processing module configured to generate a pre-processing image set by matching characteristic information of the satellite images included in the satellite image set; and a difference determination module configured to generate difference information between the plurality of satellite images by determining a difference between pre-processing images included in the pre-processing image set, wherein the characteristic information comprises at least one of illumination information and color information of the satellite image, wherein the difference determination module generates the difference information by using a deep learning technology, wherein the difference determination module generates the difference information based on a pre-defined difference detection algorithm in relation to difference detection between a plurality of images, wherein the difference detection device further comprising a learning module configured to train an adaptive difference detection algorithm in which an attention module has been added to the difference detection algorithm, wherein the difference determination module generates the difference information by using the adaptive difference detection algorithm.

6. The difference detection device of claim 5, wherein the adaptive difference detection algorithm comprises: a first attention module that is an attention module relating to a channel exchange module for changing at least one of pieces of RGB information in each of the pre-processing images of the pre-processing image set, and a second attention module that is an attention module relating to a spatial exchange module for exchanging at least one pixel of each of the pre-processing images of the pre-processing image set at specific coordinates.

* * * * *